Oct. 31, 1961 J. G. V. ISABEAU 3,006,996

PULSE-DISCRIMINATING CIRCUITS

Filed July 14, 1958 2 Sheets-Sheet 1

INVENTOR
Jean G. V. Isabeau
BY Francis W. Crotty
ATTORNEY

PULSE-DISCRIMINATING CIRCUITS

Filed July 14, 1958 2 Sheets-Sheet 2

INVENTOR
Jean G. V. Isabeau
BY Francis W. Crotty
ATTORNEY

United States Patent Office 3,006,996

Patented Oct. 31, 1961

3,006,996

PULSE-DISCRIMINATING CIRCUITS

Jean G. V. Isabeau, Lombard, Ill., assignor to Zenith Radio Corporation, a corporation of Delaware Filed July 14, 1958, Ser. No. 748,376
13 Claims. (Cl. 178—7.3)

This invention is directed to pulse-discriminating circuits which effect a separation of pulses on the basis of pulse duration. While of general application to systems employing pulse-modulated signals, the invention is especially suited to that portion of a television receiver referred to as the intersynchronizing-signal separator. Such a separator is one which extracts the line and field-synchronizing components from a received composite television signal and applies them to the usual line and field-scanning systems, respectively, for the purpose of timing the receiver operation as required to effect synthesis of a reproduced image.

The composite television signal broadcast under the authority of the Federal Communications Commission conforms to well-defined specifications in accordance with which synchronizing information devoted to line scansion has a particular duration and synchronizing information devoted to field scansion has a defined but much larger time duration. Accordingly, it is expedient to accomplish their separation, one from the other, in circuitry which is selective to the duration of applied pulses. Numerous devices operating on that principle and featuring the use of vacuum tubes or electron-discharge devices are well-known to the art. They have operated satisfactorily and are currently in wide use. However, recent trends to the substitution of transistor devices for vacuum-tube circuits makes it desirable to have available synchronizing-signal separators or pulse discriminators constructed to take advantage of unique properties of transistors and semiconductor devices. The present invention is directed to just such a discriminator.

The arrangement to be described takes advantage of a property of a transistor or semi-conductor which has no counterpart in vacuum tube devices; it is an effect referred to as "charge storage." To appreciate the concept of charge storage, it is to be noted that a transistor may be operated in a condition of voltage saturation in which, for example, the collector electrode is effectively short-circuited to the base electrode. More precisely, when the collector current has attained a maximum value determined by the external circuit and yet not sufficient to carry away or dissipate all of the injected minority carriers, a saturation condition prevails in which there is a surplusage or charge of minority carriers at the base-collector junction. In order to translate a signal variation to the collector circuit as a variation of collector current under such conditions, it is necessary that the charge of minority carriers be first swept away by recombination, absorption to the collector or base electrodes or otherwise and the time required for this to be accomplished is referred to as the charge storage time. That characteristic of the transistor varies with the specific composition of the semi-conductor and its impurity components as well as the associated circuitry and operating or biasing potentials applied to its electrodes. Since it is an effect that may be controlled, certainly within limits, and since it is a finite small interval, it represents a property that may advantageously be employed in discriminating or separating applied pulses on the basis of their pulse durations. Such a device, constructed in accordance with the subject invention, is described in detail in the ensuing description.

Hence, it is an object of the invention to provide a novel pulse-discriminating circuit employing transistor or semi-conductor devices.

It is a particular object of the invention to provide a pulse-discriminating circuit characterized by the fact that pulse discrimination is predicated upon charge storage effects of semi-conductor devices.

It is a specific object of the invention to provide a pulse-discriminating circuit, specifically an intersynchronizing-signal separator, for inclusion within a television receiver.

A pulse-discriminating circuit embodying the teachings of the invention comprises a semi-conductor body having a charge-carrier storage characteristic related to operating bias and further having signal electrodes. Means are provided for applying a forward bias potential to the electrodes to determine the charge-storage time of the semi-conductor and to establish a charge-storage condition therein. Further, there are means coupled to the electrodes for applying thereto pulse-modulated signals with a polarity and amplitude to bias the semi-conductor to a non-conductive condition. Finally, there are means connected to the electrodes for deriving an output pulse from the semi-conductor in response to an applied pulse having a duration exceeding the charge-storage time.

As applied to a multi-electrode transistor, such as a triode as distinguished from a semi-conductor diode, the arrangement includes a semi-conductor body having two conductivity zones of one type and a conductivity zone of opposite type collectively defining base-emitter and base-collector junctions. Such a transistor has base, emitter and collector electrodes coupled in signal-translating relation to those junctions and the biasing potentials establish a condition of saturation at the collector junction in addition to determining the charge-storage time. In this embodiment, a load impedance is connected in series with the collector electrode for developing an output pulse.

One feature of the invention contemplates an additional load impedance connected in series with the emitter electrode so that, in response to the application of a composite television signal including line and field-synchronizing components, separated line components appear at the emitter load and separated field components appear at the collector load.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
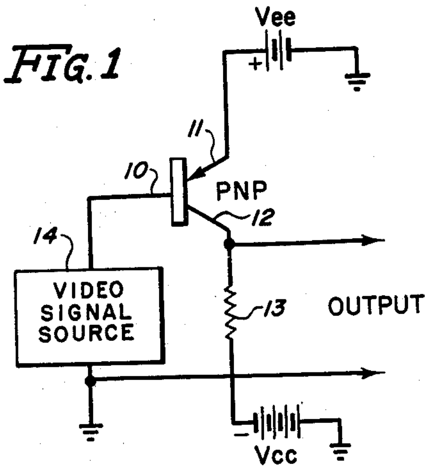
FIGURE 1 is a schematic circuit diagram of a pulse-discriminating circuit embodying the present invention.
Figure 3:
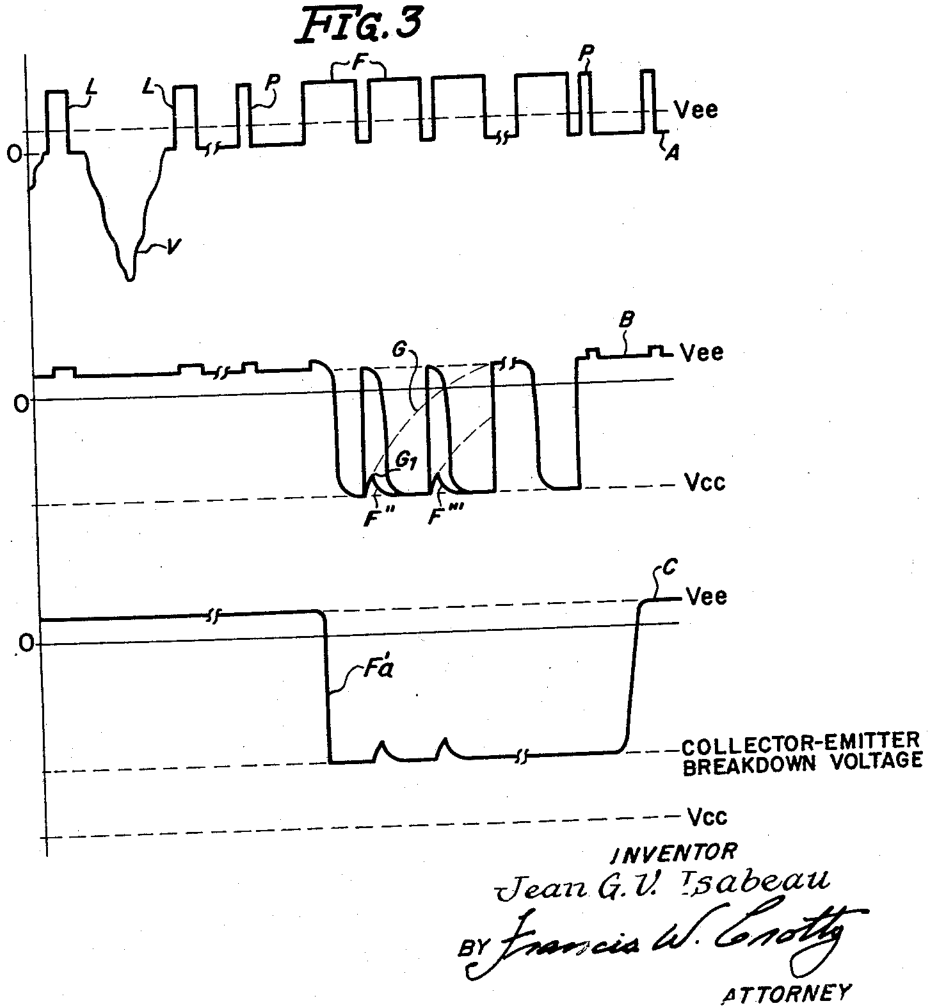
Figure 4:
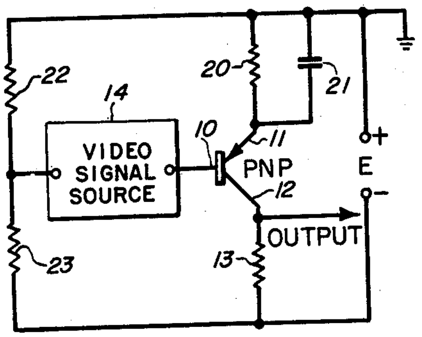

FIGURE 3 comprises graphs employed in explaining the operation of the arrangement of FIGURE 1 as an intersynchronizing-signal separator; and FIGURES 4–8, inclusive, individually represent modifications of the pulse discriminator of FIGURE 1.

Referring now more particularly to FIGURE 1, the pulse-discriminating circuit there represented comprises a junction transistor of the P-N-P type which is a semi-conductor body having two zones of P conductivity and an interposed zone of N conductivity defining base-emitter and base-collector junctions. Such a device has a charge-carrier storage characteristic or storage time which is related to or determined by the applied biasing potentials. The transistor further has base, emitter and collector electrodes 10, 11 and 12, respectively. These electrodes are coupled in signal-translating relation to the junctions and, for the simple junction-type transistor under consideration, they are coupled to the different conductivity zones as indicated.

Means are provided for applying biasing potentials to the electrodes to establish a condition of saturation at the base-collector junction and also to determine, in conjunction with the characteristics of the transistor per se and its associated circuitry, the charge-storage time of the transistor inasmuch as the storage time is a function of applied biasing potential. More specifically, emitter 11 receives a forward bias from a battery V*ee* while the collector 12 is reverse biased by a battery V*cc*. Battery V*cc* is connected to the collector through a resistor 13 constituting a load impedance connected in series with the collector. It is chosen of such magnitude as to establish a condition of voltage saturation at the collector.

A video signal source 14, shown in block diagram, is connected to base electrode 10 and may be considered as means coupled to the base and emitter electrodes for applying pulse-modulated signals thereto with a polarity and amplitude to bias the transistor to a non-conductive condition. Source 14 is preferably a low impedance source and may, for example, be a video-frequency amplifier of a television receiver for supplying a composite television signal including video, line and field-synchronizing components to the base and emitter with the synchronizing components in a positive-going direction and with sufficient amplitude that synchronizing pulses bias the transistor to cut off. An output signal may be derived across the collector load impedance 13 as represented by the output arrows.

Figure 2:
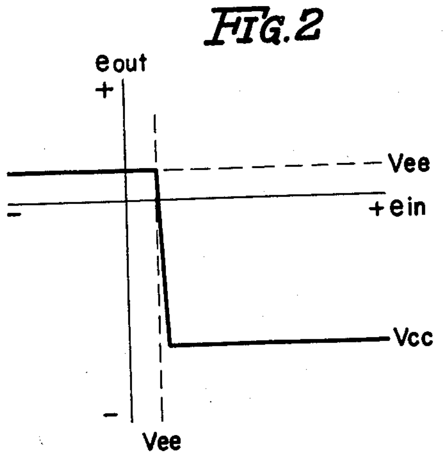
FIGURE 2 is a voltage transfer characteristic of the circuit of FIGURE 1.

The transfer characteristic of FIGURE 2 demonstrates that the potential of the output terminals is approximately equal to the emitter potenial V*ee* for all signal levels short of that level of positive polarity which effects a condition of cut off in the transistor. Actually, the applied signal of positive polarity tends to develop a reverse bias condition on the base-emitter junction and terminate the previously established injection of minority carriers. For convenience of nomenclature, this is referred to hereinafter and in the appended claims as a condition of cut off. During the condition of cut off, the collector voltage drops, that is to say becomes less positive, until it attains the potential of the collector battery V*cc*. The use of this characteristic in accomplishing pulse discrimination will be apparent in the following discussion of the family of curves of FIGURE 3. While a condition of cut off is preferred, it is not an operating requirement. This type of characteristic is realized so long as the base current is reduced to a value below that required to maintain a condition of saturation.

Curve A represents a portion of the waveform of a composite television signal conforming to current specifications of the Federal Communications Commission. It includes line-synchronizing components L of a particular width and intervening video-frequency components V. The number of lines which constitute one field of the television signal is in excess of 500 and it is not expedient to show more than a representative few in the drawing. Between successive fields, the signal has a serrated-field pulse which may be considered to comprise a succession of broad field pulses F, broad in comparison with the line components. Components P are the equalizing pulses which customarily introduce and follow the serrated field pulse.

Assuming that the transistor is biased to saturation and that the emitter voltage is at the level of V*ee*, the response of the discriminator to the application of such a composite television signal is shown by curves B and C. The expression "response" is used in a sense of the output signal developed across collector load impedance 13.

During the reception of a line-synchronizing component L, the potential of base electrode 10 is positive with respect to the emitter and the transistor is cut off; however, the base-collector junction remains short-circuited due to the charge of minority carriers at that junction. If it is assumed that the charge-storage time of the transistor as determined by its own characteristics, the associated circuitry, and the biasing potentials exceeds the duration of a line synchronizing component, the short circuit condition or saturation condition prevails throughout the duration of the pulse. Accordingly, the collector voltage remains close to V*ee* during the line pulse, and shows only a small fraction of this signal, which may be neglected for present purposes. This is also the case for the pedestal pulse P. Upon receipt of the first broad pulse F of the field component, the collector potential initially remains close to V*ee* as it did during the reception of the horizontal component but, since the charge-storage time of the transistor is substantially less than the duration of pulse F, the response to that pulse is significantly different.

Since pulse F endures for a much greater interval than the charge-storage time, the charge of minority carriers at the base-collector junction is swept out or dissipated within the pulse interval, dropping the collector potential to the level of its bias source V*cc*. Curve B shows the delay in the change in potential of the collector introduced by the time required to dissipate the charge of minority carriers. At the trailing edge of the first pulse F when the transistor is no longer cut off by the applied signal, the tendency is for the collector potential to resume its original potential V*ee* and would do so but for the capacitive effects inherent in the device and its associated circuitry, and for the finite time constant of the base-to-collector current gain of the transistor. Actually, these effects cause the potential to seek the level V*ee* exponentially as indicated by the broken-line curve G. The serration of the vertical component, that is to say, the time separation between broad pulses F, is of short duration, being even less than the duration of the line component L. Consequently, the collector potential may have attained only the potential level of $G_1$ at the occurrence of the next succeeding broad pulse F which again biases the transistor to cut off and returns the collector potential to the voltage level V*cc*. For this reason the succeeding ones of broad pulses F may be manifested only by an inward modulation or pips F'' and F'''.

The signal developed across collector load 13 therefore includes negligible components corresponding to the line and pedestal pulses and a broad pulse with serrations or inwardly extending pips corresponding to the field component and of negative polarity with respect to potential reference V*ee*. The signal may be used effectively without further clipping.

The transistor is subject to a voltage breakdown condition if the value of the collector potential source V*cc* exceeds its breakdown potential rating. Consequently, if the battery voltage V*cc* is larger than the breakdown value, the collector may fall more rapidly when the transistor is biased to cut off in the manner shown by section $F_a'$ of curve C. When this condition is encountered, the transistor remains clamped to the collector-emitter breakdown voltage level throughout the duration of the field pulse. Operation in this manner permits a larger amplitude field pulse to be derived from the collector-load impedance than the first-described condition. The operation of transistors under the condition of voltage breakdown is not entirely understood, nor is it known to be particularly stable. In some instances the clamping level persists in spite of the serrations of the field pulse and yet in other instances the serrations may be manifest in inwardly-extending pips as indicated.

The circuit of FIGURE 1, operating as described and represented by the curves of FIGURE 3, accomplishes discrimination between pulses of different pulse duration, developing an output whenever the applied pulse exceeds the charge-storage time but producing no output in response to applied pulses of lesser duration. Since the video components V of the television signal have no role in the operation of this circuit because they do not bias the transistor in the direction of cut off, it has been convenient to give consideration only to the synchronizing components of the received signal, which may be likened to a pulse-modulated signal.

The circuit of FIGURE 1 does not allow for stabilizing the operation in the face of variations in the characteristics of transistors, one with respect to the other. Stabilization may be introduced and the effects of characteristic variations of the semi-conductors themselves minimized through the modification represented in FIGURE 4. In this modification, the emitter electrode is coupled to the biasing battery E through a known form of degenerative network comprising a resistor 20 bypassed at signal frequencies by a condenser 21. Furthermore, a single battery is employed in this modification and a voltage divider is established by additional resistors 22, 23 connected thereacross. The direct-current (D.C.) feedback afforded by resistor 20 tends to establish a certain collector current but the collector circuit accepts only a fraction of that current and thereby creates a given degree of saturation. This is controllable, for example, through the choice of resistor 13.

Figure 5:
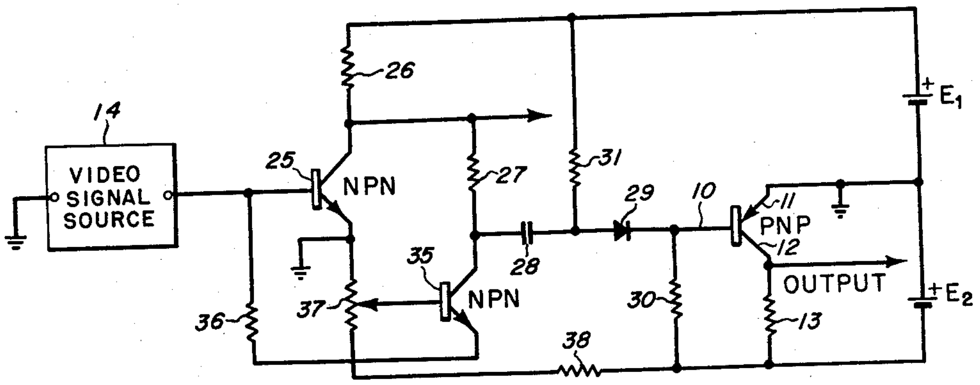

A further improvement in the fundamental circuit is represented in FIGURE 5 where the applied signal is stabilized so as to be applied to the transistor at the proper signal reference. In this modification, video signal source 14 is coupled to a video amplifier including a transistor 25 of the N-P-N type having a grounded emitter and having a collector load impedance 26. The video amplifier is A.C. coupled through a resistor 27, a condenser 28 and a diode 29 to base electrode 10 of the transistor which, in this embodiment, operates with emitter 11 grounded. The base is returned to the negative terminal of biasing battery $E_2$ through a resistor 30 to provide a substantially constant current source for the purpose of establishing saturation in the transistor. The junction of condenser 28 and the anode of diode 29 is returned to the positive terminal of the battery through a resistor 31.

As thus far described, the arrangement of FIGURE 5 is essentially the same as that of FIGURE 1, differing in only two particulars. The intersynchronizing separator is preceded by a video amplifier of the transistor type and receives an amplified video signal stabilized with respect to a desired reference level, for example the blanking level, by the circuit of diode 29. A third transistor 35 of the N-P-N type is included in the circuit to introduce a noise immunization. The collector electrode of transistor 35 is coupled to resistor 27 as a load impedance and its emitter is coupled to video source 14 through a resistor 36. A bias adjustment, permitted by a potentiometer 37 to which the base is connected, determines the threshold signal level which must be exceeded before transistor 35 translates an applied signal. Potentiometer 37 is grounded at one end and at its opposite end connects to battery $E_2$ through a resistor 38.

Neglecting for a moment the function of the circuit of transistor 35, the described arrangement operates in generally the same way as explained in connection with the signal-separating arrangement of FIGURE 1. The amplified video signal attained at the collector load impedance 26 of transistor 25 has positive-going synchronizing pulses and is applied through condenser 28 to stabilizing diode 29 for the purpose of stabilizing the amplitude level of the signal as applied to the sync separator. When a positive polarity synchronizing pulse is present, diode 29 is conductive and the constant current going through resistor 30 no longer traverses the base of transistor 10–12 but flows through the diode. This tends to establish the transistor at cut off, but has no immediate effect because of the storage of minority carriers. Additionally, current flows through the diode by way of the base-emitter junction so long as the storage is present and it is this reverse current which is largely responsible for the charge stored in condenser 28. The condenser, diode and the discharge resistor 31 function in a manner analogous to diode-type synchronizing-signal stabilization in the television art and stabilize the applied signal at a desired signal level. This level is determined as a function of the time constant of the stabilizing circuit and is usually adjusted for stabilization at or near the blanking level of the composite video signal. The stabilization is effected only as to signal components having a duration shorter than the storage time of the transistor because components of longer duration occasion cut off in the transistor. This feature, per se, introduces some noise immunity in the circuit in respect of spurious signals having a duration exceeding the charge-storage time. As previously indicated, charge-storage time may be controlled within limits by the biasing potentials through appropriate adjustment or selection of resistor 30 which is selected to establish a storage time in excess of the duration of the line-synchronizing components but small relative to the field pulses F.

In the presence of the vertical synchronizing components, an output is developed across collector load 13 as explained in the discusison of the characteristic curves of FIGURE 3. This arrangement for synchronizing-signal separation affords A.C. coupling of the synchronizing separator to the video amplifier and resistor 27 avoids unnecessary capactive loading of the amplifier.

Protection against pulses of short duration but of an amplitude in excess of the synchronizing components is provided by the third transistor 35. Protection of this type is required for the reason that experience shows a television signal is subject to be accompanied by noise signals having a much greater amplitude than the synchronizing components. If they are not effectively eliminated, they may provoke paralysis by causing undue charge conditions, say, for example, in coupling condenser 28. Transistor 35 constitutes means for effectively removing from the television signal the portion of such noise signals which exceeds the amplitude of the synchronizing components in order that the separated noise may be employed to cancel out the noise components in the video signal as applied to the synchronizing separator. More particularly, potentiometer 37 is adjusted so that amplifier 35 translates noise components only when their amplitude exceeds the synchronizing signal peaks. In other words, amplifier 35 is analogous to a voltage-gated device responsive to noise exceeding a preset bias established by the adjustment of potentiometer 37. During normal signal reception, by which is meant reception in the absence of high amplitude noise, transistor 35 is biased to cut off and the pulse-discriminator circuit operates as described. During the presence of a noise or spurious signal component exceeding the synchronizing peak amplitude, some limiting is occasioned at collector load 26 because that collector attains nearly the value of battery $E_1$ in the presence of synchronizing pulses. At the same time, the noise pulse to the extent that it exceeds the threshold bias of amplifier 35 is amplified and appears across load resistor 27 where it combines with the noise component of the signal amplified in amplifier 25. Accordingly, noise components of opposed polarities are combined at load 27 and annul one another. In fact, the reversed polarity noise pulse from transistor 35 exceeds the amplitude of the corresponding components of the video signal developed in the load circuit of transistor 25 both because of the limiting action at the collector of transistor 25 and because transistor 35 requires a smaller band-pass characteristic and may thus exhibit greater amplification. In the end result, what remains in the video signal for application to stabilizing diode 29 is a remnant noise pulse of negative polarity which causes no conduction of the diode and therefore does not disturb the stabilizing action required for the video signal.

One arrangement of the type represented in FIGURE 5 that has been constructed and successfully operated in extracting field-synchronizing components from a received television signal employed the following components:

| | |
|---|---|
| Transistor 10 | Type OC72. |
| Transistor 25 | Type 2N247. |
| Transistor 35 | Type 2N167. |
| Battery E-1 | 30 volts. |
| Battery E-2 | 7½ volts. |
| Resistor 13 | 2,200 ohms. |
| Resistor 26 | 2,700 ohms. |
| Resistor 27 | 10,000 ohms. |
| Resistor 30 | 33,000 ohms (adjustable). |
| Resistor 31 | 680,000 ohms. |
| Resistor 36 | 4,700 ohms. |
| Resistor 37 | 500 ohms. |
| Resistor 38 | 250 ohms. |

Figure 6:
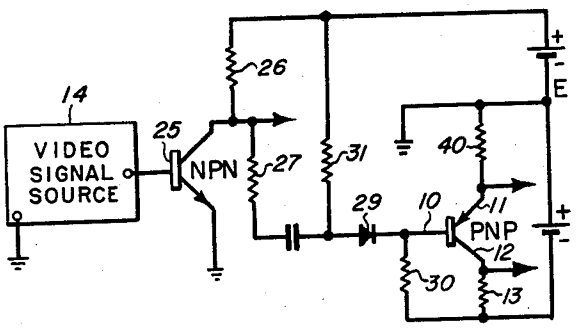

Complete intersynchronizing signal separation in which line and field-synchronizing components are separated from one another is accomplished in the modification of FIGURE 6 which is very similar to that of FIGURE 5. They differ in that the arrangement of FIGURE 6 has not been shown to include a noise-gated amplifier although it will be understood that such an amplifier may, of course, be adopted to this modification. The other change is represented by a second load impedance 40 connected in series with emitter electrode 11 of the separator. The operation of this circuit in developing field-synchronizing components across collector load impedance 13 will be apparent from the preceding discussion. Line components are developed in the emitter circuit in a very similar fashion. The saturation condition which is manifest in a charge of minority carriers at the base-collector junction is also accompanied by a similar charge of carriers at the base-emitter junction. During the presence of these charges, the collector and emitter electrodes may both be considered essentially short-circuited to the base and, therefore, they follow potential variations imposed on the base electrode by an applied signal. For this reason, signal components corresponding to the line-synchronizing pulse are developed across emitter load 40, assuming that the storage time of the base to emitter exceeds the duration of the line pulse. To achieve this result, the emitter storage time should be of the same order as the collector storage time which is not true of conventional or commercially available transistors. The desired results may nevertheless be attained with such transistors by using the collector as the emitter and vice versa.

Figure 7:
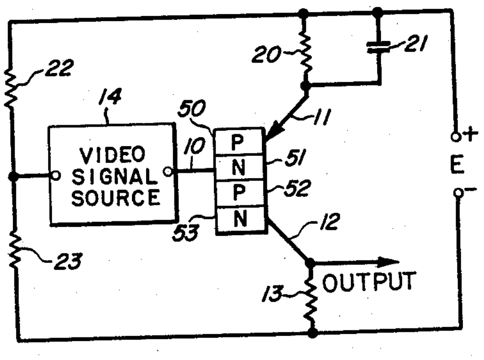

It may be desirable in particular applications of the invention to introduce a larger amplification of the separated field components and that may be achieved with the arrangement of FIGURE 7. Here the transistor has four layers as to which the conductivity alternates in the manner shown. Emitter 11 is connected to the junction of P-conductivity zone 50 and N-conductivity zone 51, the base 10 being connected to the latter. Collector 12 connects with the junction of a second P-zone 52 and a second N-zone 53. The mechanism of the earlier-described embodiments of the invention in separating the field from the line components is accomplished in the conductivity zones 50—51 and 52. The junction of zone 52 and 53 is a multiplying-collector junction so that an amplified field component is developed in collector load 13.

Figure 8:
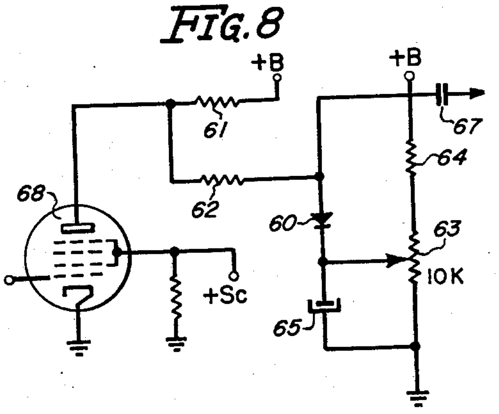

A semi-conductor diode is also subject to charge-storage effects and is suited for use in pulse-discriminating circuits of the type under consideration. Such an arrangement is illustrated in FIGURE 8 in which a semi-conductor diode 60, capable of exhibiting storage effects and having the usual signal electrodes, receives a forward bias which determines its charge-storage time and also establishes a charge-storage condition within the diode. The bias network includes resistors 61 and 62 as well as a potentiometer 63. Resistors 61 and 62 are connected in series with a potential source +B while potentiometer 63 is likewise connected to a potential source through a resistor 64. The adjustment of the potentiometer causes current to flow through the diode in the absence of signal and determines the charge condition. Condenser 65 is a by-pass at the signal frequency. The output is derived through a coupling condenser 67.

The diode circuit is preceded by a video amplifier 68 to which a composite television signal is applied with such polarity that the amplified signal appearing in the anode circuit of tube 68 has negative-going synchronizing signal components.

In the operation of the circuit, the forward bias applied to diode 60 is adjusted to the end that its storage time exceeds the duration of the line-synchronizing pulses but is short relative to the field components. Accordingly, video components, as well as line and pedestal components, are unable to overcome the shunting effect of diode 60 and do not result in an output at condenser 67. In the presence of a field component, however, diode 60 is biased to cut off after the stored charge in the diode has been dissipated or swept out. The field synchronizing component is consequently transmitted through coupling condenser 67.

It has been convenient to describe and illustrate the invention in circuitry employing semi-conductor diodes and junction-type transistors, although it may be practiced with transistors of the contact type. Contact transistors have storage times, but, generally, they are less than the storage times of junction transistors. It has further been convenient to discuss the application of the invention to the separation of synchronizing components of a composite television signal but, obviously, the circuit is not limited to that application. It is useful wherever pulses of different durations are to be separated so long as certain of the pulses have a duration less while others have a duration longer than the storage time established by the biasing potentials of the transistor or semi-conductor. The pulse discriminator is an effective and inexpensive device which takes advantage of unique characteristics of transistor and semi-conductor devices.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A pulse-discriminating circuit comprising: a semi-conductor body having a charge-carrier storage characteristic related to operating bias and having signal electrodes; means for applying a forward bias potential to said electrodes to determine the charge-storage time of said semi-conductor and to establish a charge-storage condition therein; means coupled to said electrodes for applying thereto pulse-modulated signals with a polarity and amplitude to bias said semi-conductor to a non-conductive condition; and means connected to said electrodes for deriving an output pulse from said semi-conductor in response to an applied pulse having a duration exceeding said storage time.

2. A pulse-discriminating circuit comprising: a transistor including a semi-conductor body having two conductivity zones of one type and a conductivity zone of opposite type collectively defining base-emitter and base-collector junctions, having a charge-carrier storage characteristic related to applied biasing potentials, and further having base, emitter and collector electrodes coupled in signal-translating relation to said junctions; means for applying biasing potentials to said electrodes to establish a condition of saturation at said collector junction and to determine the charge-storage time of said transistor; means coupled to said base and emitter electrodes for applying thereto pulse-modulated signals with a polarity and amplitude to bias said transistor to a non-conductive condition; and a means including load impedance connected in series with said collector electrode for developing an output pulse in response to an applied pulse having a duration exceeding said storage time.

3. A pulse-discriminating circuit comprising: a junction-type transistor including a semi-conductor body having two conductivity zones of one type and an interposed conductivity zone of opposite type collectively defining base-emitter and base-collector junctions, having a charge-carrier storage characteristic related to applied biasing potentials, and further having base, emitter and collector electrodes coupled to said junctions; means for applying biasing potentials to said electrodes to establish a condition of saturation at said collector junction and to determine the charge-storage time of said transistor; means coupled to said base and emitter electrodes for applying thereto pulse-modulated signals with a polarity and amplitude to bias said transistor to a non-conductive condition; and a means including load impedance connected in series with said collector electrode for developing an output pulse in response to an applied pulse having a duration exceeding said storage time.

4. A pulse-discriminating circuit comprising: a transistor including a semi-conductor body having two conductivity zones of one type and a conductivity zone of opposite type collectively defining base-emitter and base-collector junctions, having a charge-carrier storage characteristic related to applied biasing potentials, having a predetermined breakdown voltage rating and further having base, emitter and collector electrodes coupled in signal-translating relation to said junctions; means for applying biasing potentials to said electrodes to establish a condition of saturation at said collector junction, to determine the charge-storage time of said transistor and to establish a potential at said collector electrode exceeding said breakdown voltage rating whenever said transistor is biased to cut off for an operating interval longer than said storage time; means coupled to said base and emitter electrodes for applying thereto pulse-modulated signals with a polarity and amplitude to bias said transistor to a non-conductive condition; and a means including load impedance connected in series with said collector electrode for developing an output pulse in response to an applied pulse having a duration exceeding said storage time.

5. A pulse-discriminating circuit comprising: a transistor including a semi-conductor body having two conductivity zones of one type and a conductivity zone of opposite type collectively defining base-emitter and base-collector junctions, having a charge-carrier storage characteristic related to applied biasing potentials, and further having base, emitter and collector electrodes coupled in signal-translating relation to said junctions; means for applying biasing potentials to said electrodes to establish a condition of saturation at said collector junction and to determine the charge-storage time of said transistor; means coupled to said base and emitter electrodes for applying thereto pulse-modulated signals with a polarity and amplitude to bias said transistor to a non-conductive condition; means including a load impedance connected in series with said collector electrode for developing an output pulse in response to an applied pulse having a duration exceeding said storage time; and a charge-storage stabilizing network including a degenerative resistor connector in series with said emitter electrode and by-passed for signal frequencies.

6. A separator for effecting intersynchronizing-signal separation of the line and field-synchronizing components of a composite television signal comprising: a transistor including a semi-conductor body having two conductivity zones of P type and a conductivity zone of N type collectively defining base-emitter and base-collector junctions, having a charge-carrier storage characteristic related to applied biasing potentials, and further having base, emitter and collector electrodes coupled in signal-translating relation to said junctions; means for applying biasing potentials to said electrodes to establish a condition of saturation at said collector junction and to determine a charge-storage time for said transistor exceeding the duration of said line component but short relative to the duration of said field component; means coupled to said base and emitter electrodes for applying a composite television signal thereto with positive-going synchronizing-signal components of sufficient amplitude to bias said transistor to a non-conductive condition; and means including a load impedance connected in series with said collector electrode for developing an output pulse in response to said field components of said television signal.

7. A separator for effecting intersynchronizing-signal separation of the line and field-synchronizing components of a composite television signal comprising: a transistor including a semi-conductor body having two conductivity zones of P type and a conductivity zone of N type collectively defining base-emitter and base-collector junctions, having a charge-carrier storage characteristic related to applied biasing potentials, and further having base, emitter and collector electrodes coupled in signal-translating relation to said junctions; means for applying biasing potentials to said electrodes to establish a condition of saturation at said collector junction and to determine a charge-storage time for said transistor exceeding the duration of said line component but short relative to the duration of said field component; means coupled to said base and emitter electrodes for applying a composite television signal thereto with positive-going synchronizing-signal components of sufficient amplitude to bias said transistor to a non-conductive condition and including a stabilizing circuit for stabilizing the amplitude level of the line and field components of said composite signal; and means including a load impedance connected in series with said collector electrode for developing an output pulse in response to said field components of said television signal.

8. A separator for effecting intersynchronizing-signal separation of the line and field-synchronizing components of a composite television signal comprising: a transistor including a semi-conductor body having two conductivity zones of P type and a conductivity zone of N type collectively defining base-emitter and base-collector junctions, having a charge-carrier storage characteristic related to applied biasing potentials, and further having base, emitter and collector electrodes coupled in signal-translating relation to said junctions; means for applying biasing potentials to said electrodes to establish a condition of saturation at said collector junction and to determine a charge-storage time for said transistor exceeding the duration of said line component but short relative to the duration of said field component; means coupled to said base and emitter electrodes for applying a composite television signal thereto with positive-going synchronizing signal components of sufficient amplitude to bias said transistor to a non-conductive condition and including a peak detector for stabilizing the amplitude level of the line and field components of said composite signal; and means including a load impedance connected in series with said collector electrode for developing an output pulse in response to said field components of said television signal.

9. A noise-immune separator for effecting intersynchronizing-signal separation of the line and field-synchronizing components of a composite television signal which is subject to be received with noise signals exceeding the amplitude of said synchronizing components, said separator comprising: a transistor including a semi-conductor body having two conductivity zones of one type and a conductivity zone of opposite type collectively defining base-emitter and base-collector junctions, having a charge-carrier storage characteristic related to applied biasing potentials, and further having base, emitter and collector electrodes coupled in signal-translating relation to said junctions; means for applying biasing potentials to said electrodes to establish a condition of saturation at said collector junction and to determine a charge-storage time for said transistor exceeding the duration of said line component but short relative to the duration of said field component; means coupled to said base and emitter electrodes for applying a composite television signal thereto with synchronizing-signal components of such polarity and sufficient amplitude to bias said transistor to a non-conductive condition and including means for effectively removing from said television signal portions of noise signals which exceed the amplitude of said synchronizing components; and means including a load impedance connected in series with said collector electrode for developing an output pulse in response to said field components of said television signal.

10. A noise-immune separator for effecting intersynchronizing-signal separation of the line and field-synchronizing components of a composite television signal which is subject to be received with noise signals exceeding the amplitude of said synchronizing components, said separator comprising: a transistor including a semi-conductor body having two conductivity zones of one type and a conductivity zone of opposite type collectively defining base-emitter and base-collector junctions, having a charge-carrier storage characteristic related to applied biasing potentials, and further having base, emitter and collector electrodes coupled in signal-translating relation to said junctions; means for applying biasing potentials to said electrodes to establish a condition of saturation at said collector junction and to determine a charge-storage time for said transistor exceeding the duration of said line component but short relative to the duration of said field component; means coupled to said base and emitter electrodes for applying a composite television signal thereto with synchronizing signal components of such polarity and sufficient amplitude to bias said transistor to a non-conductive condition; means for separating from said television signal noise signals which exceed said synchronizing components in amplitude and for effectively applying said separated noise signals to said base and emitter electrodes to cancel noise signals from the television signal applied to such electrodes; and means including a load impedance connected in series with said collector electrode for developing an output pulse in response to said field components of said television signal.

11. A separator for effecting intersynchronizing-signal separation of the line and field-synchronizing components of a composite television signal comprising: a transistor including a semi-conductor body having two conductivity zones of one type and a conductivity zone of opposite type collectively defining base-emitter and base-collector junctions, having a charge-carrier storage characteristic related to applied biasing potentials, and further having base, emitter and collector electrodes coupled in signal-translating relation to said junctions; means for applying biasing potentials to said electrodes to establish a condition of saturation at said collector junction and to determine a charge-storage time for said transistor exceeding the duration of said line component but short relative to the duration of said field component; means coupled to said base and emitter electrodes for applying a composite television signal thereto with synchronizing-signal components of such polarity and sufficient amplitude to bias said transistor to a non-conductive condition; a load impedance connected in series with said emitter electrode for developing an output pulse in response to said line components of said television signal; and means including a load impedance connected in series with said collector electrode for developing an output pulse in response to said field components of said television signal.

12. A pulse-discriminating circuit comprising: a diode including a semi-conductor body having a charge-carrier storage characteristic related to operating bias and having signal electrodes; means for applying a forward bias potential to said electrodes to determine the charge-storage time of said semi-conductor and to establish a charge-storage condition therein; means coupled to said electrodes for applying thereto pulse-modulated signals with a polarity and amplitude to bias said semi-conductor to a non-conductive condition; and means connected to said electrodes for deriving an output pulse from said diode in response to an applied pulse having a duration exceeding said storage time.

13. A pulse-discriminating circuit comprising: a transistor including a semi-conductor body having two conductivity zones of one type and a conductivity zone of opposite type collectively defining base-emitter and base-collector junctions, having a charge-carrier storage characteristic related to applied biasing potentials, and further having base, emitter and collector electrodes coupled in signal-translating relation to said junctions; means for applying biasing potentials to said electrodes to establish a condition of saturation at said collector junction and to determine the charge-storage time of said transistor; means coupled to said base and emitter electrodes for applying thereto pulse-modulated signals with a polarity and amplitude to bias said transistor to a non-conductive condition; means including a load impedance connected in series with said collector electrode for developing an output pulse in response to an applied pulse having a duration exceeding said storage time; and a charge-storage stabilizing network including a feedback connection from one of said emitter and collector electrodes to said base electrode.

References Cited in the file of this patent

UNITED STATES PATENTS

| | | |
|---|---|---|
| 2,797,259 | Thomas | June 25, 1957 |
| 2,864,888 | Goodrich | Dec. 16, 1958 |
| 2,878,312 | Goodrich | Mar. 17, 1959 |
| 2,905,815 | Goodrich | Sept. 22, 1959 |

OTHER REFERENCES

Wireless World, "Transistor Television Circuits," April 1958, pages 154–158. (Copy in Division 51.)